Dec. 11, 1956  F. L. M. GARARD, SR  2,773,564
ADJUSTABLE WHEEL CHOCK
Filed April 2, 1953
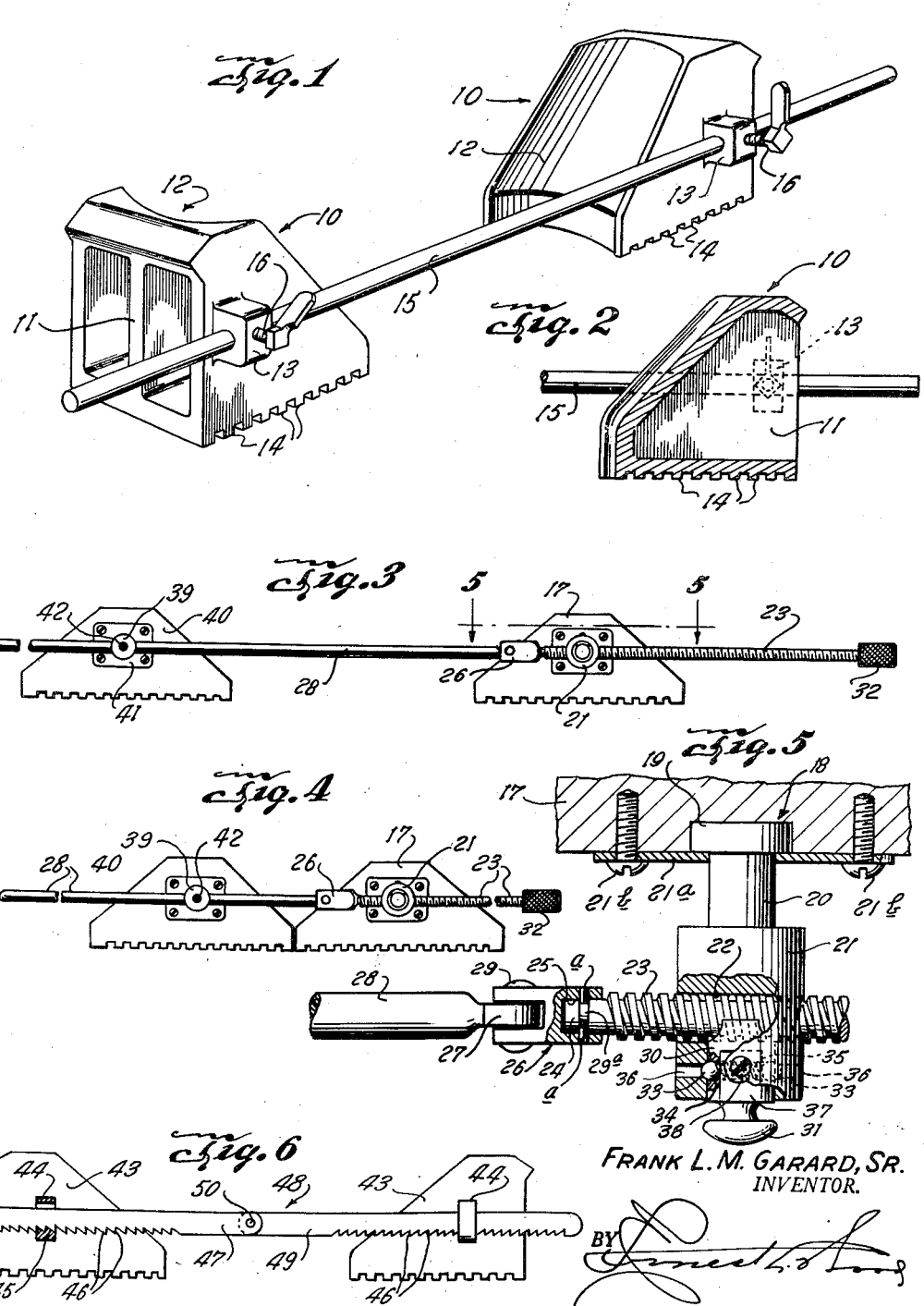
FRANK L. M. GARARD, SR.
INVENTOR.
BY
ATTORNEY

United States Patent Office 2,773,564
Patented Dec. 11, 1956

2,773,564

ADJUSTABLE WHEEL CHOCK

Frank L. M. Garard, Sr., Dallas, Tex.; Helen Ida Garard, executrix of said Frank L. M. Garard, deceased Application April 2, 1953, Serial No. 346,479

5 Claims. (Cl. 188—32)

This invention relates to wheel chocks and more particularly to wheel chocks for automobiles, trucks and trailers.

The principal object of the invention is to provide wheel chocks adapted to be joined together in pairs for relative movement to accommodate vehicle wheels of different diameters, the connecting means between the wheel chocks being of such nature as to prohibit relative movement of the chocks once they are adjusted to the desired position and further, to enable the positions of the wheel chocks to be reversed to adapt the same to tandem truck and trailer wheels.

Another object of the invention is to provide wheel chocks which are joined together by a connecting means composed of longitudinally aligned and pivoted sections to permit foldability so that the one chock may be disposed on top of the companion chock when not in use, thus to conserve space in storage.

Broadly, the invention provides a motorist, trucker or the owner of a trailer house means by which to stabilize his vehicle while making repairs to tires or the like and obviates the necessity for searching for temporary or makeshift wheel chocks, such as rocks, pieces of wood and the like. The wheel chocks of the invention may be removed from a convenient storage in the vehicle, placed in position and adjusted to the wheels of the vehicle in a minimum of time and as quickly removed and returned to storage when no longer needed.

Further objects of the invention will become apparent as the description proceeds, taken in connection with the accompanying drawing wherein:

Figure 1 is a perspective view of a pair of complementary wheel chocks joined together according to the invention.

Figure 2 is a vertical sectional view of one of the wheel chocks.

Figure 3 is a side elevational view showing a modified form of the means for joining the wheel chocks for relative adjustment.

Figure 4 is a view similar to Figure 3 but showing a wheel chock in a position reversed to that of Figure 3.

Figure 5 is a fragmentary sectional view on a larger scale showing structural details of the form of invention shown in Figures 3 and 4; and Figure 6 is a side elevational view of still another modified connecting means for the wheel chocks.

Continuing with a more detailed description of the drawing, reference numeral 10 denotes the wheel chock of the pair shown in Figures 1 and 2. The wheel chock is preferably molded from a light material such as aluminum and is further lightened by being hollow but reinforced by a vertical web 11. The operative face of the wheel chock is concave as at 12 and on one side of the chock is formed an integral boss 13 through which is bored a passageway parallel with the base of the chock, the said base being formed with transverse ridges 14 to preclude slippage of the chock on its supporting surface.

Extending through the bores in the boss 13 of the chocks is a rod 15 which constitutes the connecting means between the chocks. A levered set screw 16 is threaded into the end of the boss 13 to engage the rod 15 in order to prevent slippage thereof through the bosses and thus to secure the chocks immovably against the tread of a vehicle wheel on each side of which the chocks are disposed.

In Figures 3, 4 and 5 is shown a modified form of the invention and in which the chocks 17 are not unlike the chocks shown in Figures 1 and 2 except for the connecting means between the chocks and the manner in which said connecting means is joined to the chocks. In the modified form of the invention, the chock 17 of the pair of chocks has an annular recess 18 (Figure 5) formed in one side thereof adapted to accommodate the correspondingly shaped member 19 of a pin 20, the latter having an enlarged head 21. A plate 21a is held by screws 21b to retain the member 19 in the recess 18. The enlarged head 21 has a diametrical and threaded bore 22 through which extends threaded rod 23. One end of the rod 23 has a flat, annular head 24 rotatably mounted in a socket 25 formed therefor in one end of a bifurcated member 26. The opposite and bifurcated end of the member 26 receiving the apertured end 27 of a smooth rod 28 which is pivotally joined to the member 26 by a pivot pin 29, in order that the rod 28 may be folded onto the threaded rod 23 when the chocks are not in use. Diametrically opposed pins a extend through the walls of the socket member 26 and engage in an annular groove 29a, made in the rod 23 adjacent end 24, which rotates in the socket 25. The bore 22 in the head 21 is smooth so that the threaded rod 23 may move freely therethrough. However, to restrict the rod 23 to longitudinal displacement through rotation only, a shoe 30 is mounted for limited longitudinal displacement in an axial bore originating at the outer end of the head 21 and communicating with the diametrical bore 22. The shoe 30 has segmental threads engaging those of the rod 23 so that when the same is thrust inwardly by inward pressure on the knob 31, the rod 23 cannot be moved longitudinally except through rotation accomplished through the medium of the knurled handle 32 on the opposite end of the rod 23. The shoe 30 is held against accidental displacement from operative position by ball detents 33 set in the opposite ends of a diametrical passage 34 through the shoe 30 and in which is disposed a coil spring 35 exerting an opposing force against the ball detents 33, effective to restrict them in the ends of bores 36 extending through the walls of the head 21 and communicating with the axial bore in which the shoe 30 is disposed. To prevent rotation of the shoe 30, one side 37 is flattened and a set screw 38 threaded in the head 21 bears against the flattened surface 37. The ball detents 33 enable the shoe 30 to be withdrawn out of engagement with the threads of the rod 23 so that the latter may be freely moved in the bore 22 of the head 21.

The rod 28 extends through a diametrical opening in the head 39 which is rotatably secured to a companion chock 40 by means of a plate 41. A counter-sunk set screw 42 extends axially into the head 39 to bear against the rod 28 to hold the same against longitudinal displacement in the head 39 or, conversely, to prevent movement of the chock 40 on the rod 28. Adjustment of the chock 17 in relation to the chock 40, to adapt the same to a vehicle wheel, is accomplished by releasing the shoe 30 from the threads of the rod 23 in the manner described and by pushing the chock 17 against the vehicle wheel opposite the chock 40. The shoe 30 is then brought into engagement with the threads of the rod 23 after which the handle 32 is rotated to advance the chock 17 further against the tire of the wheel, thus holding the vehicle stationary.

In Figure 6 is shown a further modified example of the invention wherein numeral 43 denotes identical chocks, each having formed on each side thereof gears 44. Each gear has a passage therethrough parallel with the side of the chock and at the bottom of the passage is formed one or more upwardly extending projections or teeth 45. These teeth are engaged by corresponding teeth 46 formed on one edge of a section 47 of a connecting bar 48. The companion section 49 of the bar is pivoted at 50 to the end of the bar section 47 so that the sections 47 and 49 may be folded into parallelism when not in use. The arrangement shown provides a form of ratchet, the teeth 46 of the bar 48 being inclined in a direction tending to hold the chocks against movement in one direction while permitting the movement in the opposite direction, yet enabling the sections 47 and 49 to be lifted at their ends opposite their pivotal points out of engagement with the teeth 45 so that the chocks may be moved freely on the bar 48.

It is evident from the foregoing that the invention may be quickly and advantageously set up and adjusted to the wheel of a vehicle to prevent accidental rolling thereof, and after having been used, the invention in any of its forms may be conveniently stored in a minimum of space in the vehicle.

Manifestly, the construction as shown and described is capable of some modification and such modification as may be construed to fall within the scope and meaning of the appended claims is also considered to be within the spirit and intent of the invention.

What is claimed is:

1. A vehicle stabilizing means comprising a pair of chocks, a connecting means for holding said chocks in spaced apart relationship, said connecting means comprising a bar in relatively pivoted and longitudinally alignable sections, one of which sections is threaded longitudinally, rotatable means carried by each of said chocks for slidably receiving the sections of said bar, means included in the pivotal connection of the threaded section to the adjacent section permitting rotation of the threaded section of said bar, means carried by the rotatable bar receiving means of one of said chocks and engaging the threaded section of said bar to hold the latter against other than rotative longitudinal movement through said bar receiving means to effect a change in the position of said one of said chocks in relation to the companion chock and means for securing the companion chock against movement in relation to the companion section of said bar.

2. A vehicle stabilizing means comprising complementary wheel chocks, a connecting bar in relatively pivoted and longitudinally alignable sections, one of which sections is rotatable and threaded longitudinally, means on one of said chocks for receiving the other section of said bar for free sliding movement, means for holding said chock against sliding movement on said other bar section and means carried by the companion chock adapted to engage and disengage the threads of the threaded section of said bar to respectively restrict movement of said companion chock to that effected by rotation of said threaded bar section and releasing said chock for free movement on said threaded bar section.

3. A vehicle stabilizing device comprising spaced apart and complementary wheel chocks, a connecting bar in two relatively pivoted and longitudinally alignable sections, one of which sections is rotatable and threaded longitudinally, means for engaging one of said chocks in relation to the threads of said threaded bar section, whereby said one of said chocks will move toward and away from the companion chock when said threaded bar section is rotated, means carried by the companion chock receiving the companion bar section for free and unrestricted longitudinal displacement, and means for securing said companion chock against movement in relation to said bar.

4. The structure of claim 3 and in which the means for engaging said one of said chocks with the threaded section of said bar is comprised of a pin having a cylindrical head through which said threaded section extends for free longitudinal displacement and means movable axially in said head and engaging threads of said threaded bar section to hold the latter against other than rotative and longitudinal movement through said head and when moved axially out of engagement with said threaded bar section will permit free longitudinal displacement of said threaded bar section through said head.

5. The structure of claim 3 in which the rod section receiving means on each of said chocks is rotatable in relation to its respective chock.

References Cited in the file of this patent
UNITED STATES PATENTS

| | | |
|---|---|---|
| 970,841 | MacConnell | Sept. 20, 1910 |
| 1,174,410 | Hajasok et al. | Mar. 7, 1916 |
| 2,011,469 | Brueggemann | Aug. 13, 1935 |
| 2,491,989 | Lind | Dec. 20, 1940 |